(12) United States Patent
Labreuche et al.

(10) Patent No.: US 10,769,541 B2
(45) Date of Patent: Sep. 8, 2020

(54) METHOD FOR DETERMINING TACTICAL ACTIONS

(71) Applicant: THALES, Courbevoie (FR)

(72) Inventors: Christophe Camille Labreuche, Palaiseau (FR); Helia Pouyllau, Palaiseau (FR); Pierre Saveant, Palaiseau (FR); Yann Semet, Palaiseau (FR); Jan-Egbert Hamming, Hengelo (NL); Maurice Houtsma, Hengelo (NL)

(73) Assignee: THALES, Courbevoie (FR)

( * ) Notice: Subject to any disclaimer, the term of this patent is extended or adjusted under 35 U.S.C. 154(b) by 69 days.

(21) Appl. No.: 15/560,510

(22) PCT Filed: Mar. 23, 2016

(86) PCT No.: PCT/EP2016/056428
§ 371 (c)(1),
(2) Date: Sep. 22, 2017

(87) PCT Pub. No.: WO2016/151034
PCT Pub. Date: Sep. 29, 2016

(65) Prior Publication Data
US 2018/0060751 A1    Mar. 1, 2018

(30) Foreign Application Priority Data

Mar. 23, 2015  (EP) .................................. 15290082

(51) Int. Cl.
*G06N 7/00* (2006.01)
*G06Q 90/00* (2006.01)
(Continued)

(52) U.S. Cl.
CPC ........... *G06N 7/005* (2013.01); *G06F 9/5011* (2013.01); *G06Q 90/00* (2013.01)

(58) Field of Classification Search
CPC ...... G06N 7/005; G06F 9/5011; G06Q 90/00; G01S 7/415; F41H 11/00
See application file for complete search history.

(56) References Cited

U.S. PATENT DOCUMENTS 6,903,676 B1    6/2005  Frady et al.
2008/0097948 A1    4/2008  Funge et al.
(Continued)

FOREIGN PATENT DOCUMENTS

CN    101 364 104 A    2/2009
CN    202 603 900 U    12/2012
(Continued)

OTHER PUBLICATIONS

International Search Report, dated May 30, 2016, from corresponding PCT/EP2016/056428 application.
(Continued)

*Primary Examiner* — Laura A Gudorf
(74) *Attorney, Agent, or Firm* — Nixon & Vanderhye

(57) ABSTRACT

Disclosed is a method for determining tactical actions for protecting a reference entity with respect to a plurality of entities in a battlefield environment, the method including: segmenting the battlefield environment into a plurality of layers; associating actable deterrent systems with each layer; obtaining data representative of the probability, for each deterrent system, that the considered deterrent system deters an entity in the associated layer; providing, for each entity, the level of threat of the entity; and computing a cost function for determining the deterrent systems to be engaged by the reference entity for rendering extremal the cost function, the cost function being a function depending from the provided level of threat and the obtained data.

16 Claims, 3 Drawing Sheets

(51) Int. Cl.
*G06F 9/00* (2006.01)
*G06F 9/50* (2006.01)

(56) References Cited

U.S. PATENT DOCUMENTS

| | | | |
|---|---|---|---|
| 2009/0006166 A1 | 1/2009 | Do | |
| 2009/0223354 A1* | 9/2009 | Root, Jr. ............... | G01S 7/22 89/1.11 |
| 2012/0000349 A1* | 1/2012 | Couronneau ............ | F41G 3/04 89/1.11 |
| 2012/0327762 A1 | 12/2012 | Cohn et al. | |
| 2014/0283055 A1 | 9/2014 | Zahran | |
| 2015/0276355 A1* | 10/2015 | Komukai ................ | F41H 11/00 89/1.11 |

FOREIGN PATENT DOCUMENTS

| | | | |
|---|---|---|---|
| CN | 103 019 673 A | | 4/2013 |
| EP | 0310869 | | 4/1989 |
| KR | 20120126511 A | * | 11/2012 |

OTHER PUBLICATIONS

EP Search Report, dated Dec. 16, 2015, from corresponding EP 15 29 0082 application.
Michael V. Finn et al., "Simple Analytic Solutions to Complex Military Problems", A Rand Note, N-2211-AF, Aug. 1985, The Rand Corporation, pp. 1-39.
"Aggro," Revision as of 09:25, Feb. 7, 2014 by Gourra, retrieved from https://wow.gamepedia.com/index.php?title=Aggro&oldid=3311870.
"Aggro radius," Revision as of 21:12, Dec. 31, 2013 by Jerodast, retrieved from https://wow.gamepedia.com/index.php?title=Aggro_radius&oldid=3290190.
"Artificial Intelligence," Revision as of 05:13, Dec. 12, 2008 by Rolandius, retrieved from https://wow.gamepedia.com/index.php?title=Artificial_intelligence&oldid=1703012.
"Battleship," Revision as of 04:15, Jan. 22 2013 by Sandwichman2448, retrieved from https://wow.gamepedia.com/index.php?title=Battleship&oldid=3087470.
"Level," Revision as of 19:53, Mar. 3, 2014 by Taohinton, retrieved from https://wow.gamepedia.com/index.php?title=Level&oldid=3325489.
"Mechanical," Revision as of 19:10, Nov. 8, 2014 by Surafbrov, retrieved from https://wow.gamepedia.com/index.php?title=Mechanical&oldid=3490729.
"Mob," Revision as of 21:19, Jun. 20, 2012, retrieved from https://wow.gamepedia.com/index.php?title=Mob&oldid=2929093.
"Player character," Revision as of 03:57, Dec. 13, 2010 by Red dog, retrieved from https://wow.gamepedia.com/index.php?title=Player_character&oldid=2547417.
Schuck et al., "Description of the Choquet Integral for Tactical Knowledge Representation," Published in: 2010 13th International Conference on Information Fusion, Jul. 26-29, 2010.
"Threat," Revision as of 07:05, Mar. 26, 2014 by Seahen, retrieved from https://wow.gamepedia.com/index.php?title=threat&oldid=3333084.

* cited by examiner

US 10,769,541 B2

METHOD FOR DETERMINING TACTICAL ACTIONS

FIELD OF THE INVENTION

The present invention concerns a method for determining tactical actions for protecting a reference entity with respect to a plurality of entities in a battlefield environment. The present invention also concerns an associated decision support method. The present invention also relates to a computer program, a computer readable medium, a system for determining tactical actions for protecting a reference entity with respect to a plurality of entities in a battlefield environment and a decision support system.

BACKGROUND OF THE INVENTION

To manage critical situations in a battlefield environment, accurate decision support tools can be used. In particular, decision support systems can be used in a battlefield environment to help an operator decide which battle actions to trigger, when threats are detected from targets in the surrounding environment of the operator. Such decision support tools can use in combination different types of sensors, actuators, user interfaces and data representations.

However, no accurate decision support tools exist, the safest being to rely on the knowledge of an operator.

BRIEF SUMMARY OF THE INVENTION

The invention aims at solving the problems of obtaining a reliable decision support tool.

To this end, the invention concerns a method for determining tactical actions for protecting a reference entity with respect to a plurality of entities in a battlefield environment, the method comprising segmenting the battlefield environment into a plurality of layers, associating actable deterrent systems with each layer, obtaining data representative of the probability, for each deterrent system, that the considered deterrent system deters an entity in the associated layer, providing, for each entity, the level of threat of said entity, and computing a cost function for determining the deterrent systems to be engaged by the reference entity for rendering extremal the cost function, the cost function being a function depending from the provided level of threat and the obtained data.

Thanks to the invention, reliable data relative to the most favorable plan engagements can be obtained.

This enables to provide to an operator a reliable decision support tool since it provides to the plan engagement with a chance estimation.

According to further aspects of the invention that are advantageous but not compulsory, the method for evaluating might incorporate one or several of the following features, taken in any technically admissible combination:
- at the obtaining step, data representative of the nature of the entity are obtained.
- at the computing step, the cost function depends at least from the product of the provided level of threat and the obtained data.
- at the obtaining step, data representative of the consumption of the considered deterrent system are obtained.
- at the computing step, the imposed engagement policies are taken into account.
- the method further comprises a step of associating with each layer a category of tactical actions that may be engaged by the reference entity.
- the method further comprises a step of associating at least one geographical parameter with each layer, said parameters comprising the distance range delimiting the layer, said distance range being associated with a begin range and an end range.
- the distance range associated with each layer is predefined and static.
- the distance range associated with each layer is dynamically defined depending on predefined criteria.
- the entities and the reference entity are ships.

The invention also concerns a decision support method comprising the steps of carrying out a method for determining tactical actions for protecting a reference entity with respect to a plurality of entities in a battlefield environment as previously described and of generating tactical recommendations in association with the determined deterrent systems to be engaged.

The invention also relates to a computer program comprising instructions for carrying out the steps of a method as previously described when said computer program is executed on a suitable computer device.

The invention also concerns a computer readable medium having encoded thereon a computer program as previously described.

The invention also relates to a system for determining tactical actions for protecting a reference entity with respect to a plurality of entities in a battlefield environment, the system comprising a calculator adapted to segment the battlefield environment into a plurality of layers, and an obtaining unit adapted to obtain data representative of the probability, for each deterrent system, that the considered deterrent system deters an entity in the associated layer, the calculator being further adapted to associate actable deterrent systems with each layer, to provide, for each entity, the level of threat of said entity and to compute a cost function for determining the deterrent systems to be engaged by the reference entity for rendering extremal the cost function, the cost function being a function depending from the provided level of threat and the obtained data.

The invention also concerns a decision support system comprising a system for evaluating as previously described, the calculator being further adapted to generate tactical recommendations in association with the determined deterrent systems to be engaged.

It is also proposed a method for evaluating the level of threat of at least one entity among a plurality of entities in a battlefield environment, the level of threat being evaluated with respect to a reference entity to be protected, the method comprising the steps of segmenting the battlefield environment into a plurality of layers, obtaining data representative of a position of said entity with respect to the layers of the battlefield environment, and determining the level of threat of said entity using the obtained data.

According to further aspects of the invention that are advantageous but not compulsory, the method for evaluating might incorporate one or several of the following features, taken in any technically admissible combination:
- the method further comprises a step of associating with each layer at least one of the following: a category of tactical actions that may be engaged by the reference entity, at least one geographical parameter with each layer, said parameter(s) comprising the distance range delimiting the layer, said distance range being associated with a begin range and an end range.
- the method further comprises a step of associating at least one geographical parameter with each layer, said parameter(s) comprising the distance range delimiting the layer, said distance range being associated with a begin range and an end range, the distance range associated with each layer being either predefined and static or dynamically defined for each entity of the plurality of entities depending on predefined criteria.

at the obtaining step, data representative of the behavior of said entity are also obtained, the data representative of the behavior including data relative to the kinematics of said entity and data representative of the identity of said entity with relation to the reference entity.

at the obtaining step, data representative of the dangerousness of said entity are also obtained.

at the obtaining step, data representative of the urgency of the potential threat represented by said entity and/or data representative of the capability to engage and deter or kill the potential threat represented by said entity are also obtained.

at the determining step, a machine learning algorithm is applied.

at the determining step, the obtained data are aggregated using a Choquet integral and/or a generalized additive independence model.

the entities and the reference entity are ships.

The invention also concerns a decision support method comprising the steps of carrying out a method for evaluating the level of threat of at least one entity among a plurality of entities in a battlefield environment as previously described, generating tactical recommendations in association with said entity depending on the determined level of threat.

According to a specific embodiment, the decision support method is carried out iteratively.

The invention also relates to a computer program comprising instructions for carrying out the steps of a method as previously described when said computer program is executed on a suitable computer device.

The invention also concerns a computer readable medium having encoded thereon a computer program as previously described.

The invention also relates to a system for evaluating the level of threat of at least one entity among a plurality of entities in a battlefield environment, the level of threat being evaluated with respect to a reference entity to be protected, the system comprising a calculator adapted to segment the battlefield environment into a plurality of layers, and an obtaining unit adapted to obtain data representative of a position of said entity with respect to the layers of the battlefield environment, the calculator being further adapted to determine the level of threat of said entity using the obtained data.

The invention also concerns a decision support system comprising a system for evaluating as previously described, the calculator being further adapted to generate tactical recommendations in association with said entity depending on the determined level of threat.

BRIEF DESCRIPTION OF THE DRAWINGS

The invention will be better understood on the basis of the following description, which is given in correspondence with the annexed figures and as an illustrative example, without restricting the object of the invention. In the annexed figures.

DETAILED DESCRIPTION OF SOME EMBODIMENTS

Figure 1:
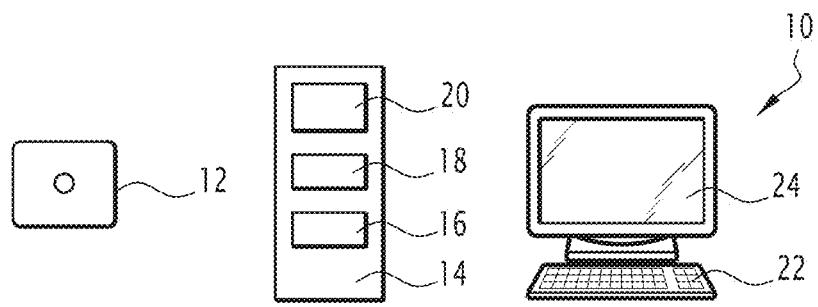
FIG. 1 is a schematic representation of a system and a computer program product, whose interaction enables to carry out a method.

A system 10 and a computer program product 12 are represented in FIG. 1. The interaction between the computer program product 12 and the system 10 enables to carry out a method.

System 10 is a computer. In the present case, system 10 is a laptop.

More generally, system 10 is a computer or computing system, or similar electronic computing device adapted to manipulate and/or transform data represented as physical, such as electronic, quantities within the computing system's registers and/or memories into other data similarly represented as physical quantities within the computing system's memories, registers or other such information storage, transmission or display devices.

System 10 comprises a processor 14, a keyboard 22 and a display unit 24.

The processor 14 comprises a data-processing unit 16, memories 18 and a reader 20 adapted to read a computer readable medium.

The computer program product 12 comprises a computer readable medium.

The computer readable medium is a medium that can be read by the reader of the processor. The computer readable medium is a medium suitable for storing electronic instructions, and capable of being coupled to a computer system bus.

Such computer readable storage medium is, for instance, a disk, a floppy disks, optical disks, CD-ROMs, magnetic-optical disks, read-only memories (ROMs), random access memories (RAMs) electrically programmable read-only memories (EPROMs), electrically erasable and programmable read only memories (EEPROMs), magnetic or optical cards, or any other type of media suitable for storing electronic instructions, and capable of being coupled to a computer system bus.

A computer program is stored in the computer readable storage medium. The computer program comprises one or more stored sequence of program instructions.

The computer program is loadable into the data-processing unit 16 and adapted to cause execution of a method is run by the data-processing unit 16.

Figure 2:
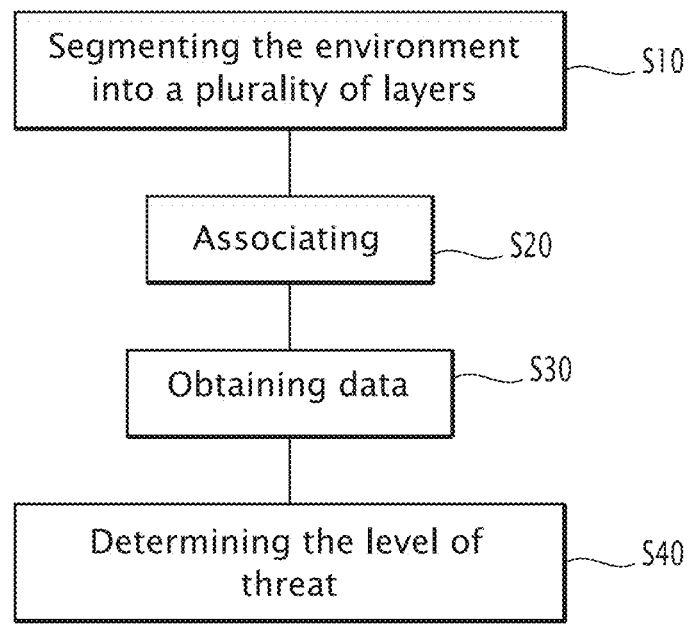
FIG. 2 is a flowchart of an example of carrying out of a method for evaluating the level of threat comprising a step of determining the level of threat.

Operation of the system 10 is now described in reference to the flowchart of FIG. 2, which illustrates an example of carrying out a method for evaluating the level of threat of at least one entity among a plurality of entities in a battlefield environment. In the remainder of the description, such method is labeled "a method for evaluating". The one entity considered for which the level of threat is to be estimated is the suspicious entity. Such suspicious entity is labeled SE in the remainder of the description.

The level of threat is evaluated with respect to a reference entity RE to be protected.

According to a preferred embodiment, each suspicious entity SE is a ship and the reference entity RE is also a ship.

The number of suspicious entities SE depends on the operational situation and varies over time.

According to an embodiment, the number of suspicious entities SE is 0, which is the case if there is no activity around the reference entity RE.

Alternatively, the number of suspicious entity SE is superior or equal to 5.

According to another embodiment, the number of suspicious entities SE is superior or equal to 50 if the range of the area under surveillance is large and there is a lot of civilian activity (fishing boats notably).

The method for evaluating comprises four steps: a segmenting step S10, an associating step S20, an obtaining step S30 and a determining step S40.

At the segmenting step S10, the battlefield environment is segmented into a plurality of layers.

Figure 3:
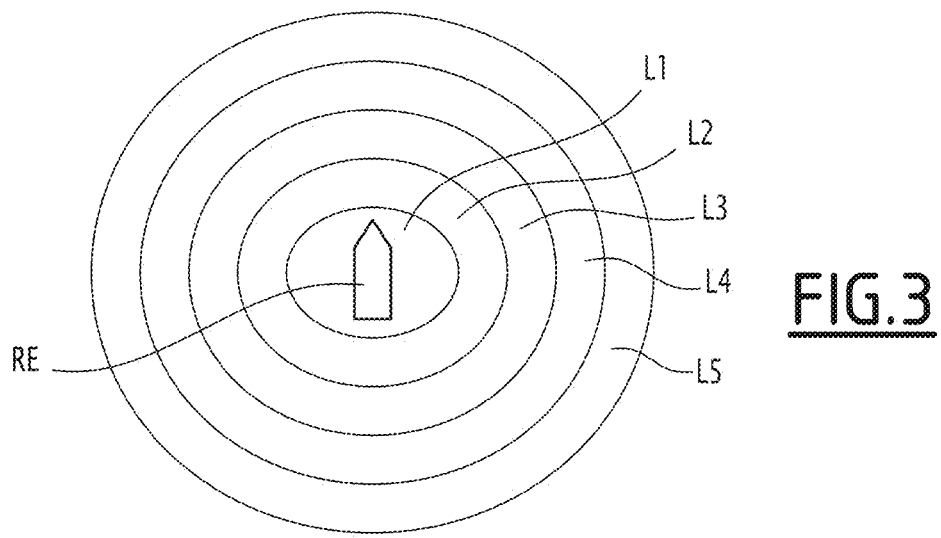
FIG. 3 is a schematic representation of a segmented environment.

The segmentation of the environment which results from the segmenting step S10 is represented on FIG. 3.

It appears that the environment of the reference entity RE is separated in five layers which are from the closest to the furthest from the reference entity RE: a first layer L1, a second layer L2, a third layer L3, a fourth layer L4 and a fifth layer L5.

Each layer is delimited by at least one circle so that the first layer L1 has the shape of disk whereas the other layers L2, L3, L4 and L5 have an annular shape.

Alternatively, each layer is delimited by more complex shape of boundary. This is in particular the case if the suspicious ship SE is close of a shore. The boundary may be distorted in the direction of the shore.

At the associating step S20, each layer L1, L2, L3, L4 and L5 is associated to a category of tactical actions that may be engaged by the reference entity RE.

According to the illustrated example, each layer L1, L2, L3, L4 and L5 is associated to the main operational mission to be fulfilled.

In the example, the first layer L1 is the closest to the reference entity RE. When a suspicious entity SE is this close from the reference entity RE, the reference entity RE cannot use its weaponry, only the crew can defend themselves. For this reason, the first layer L1 is also named the "no capacity layer".

For the second layer L2, the reference entity RE can use lethal effectors and actively engage suspicious entities SE. For this reason, the second layer L2 is also named the "engage layer".

In the third layer L3, the reference entity RE is entitled to use non-lethal effectors to try to actively discourage suspicious entities SE from engaging or coming closer. Therefore, the third layer L3 is also named the "deter layer".

In the fourth layer L4, soft, information bearing effectors can be used by the reference entity RE to warn enemy entities. Thus, the fourth layer L4 is also named the "warn layer".

For a potential enemy entity in the fifth layer L5, only identification actions can be performed, no effector, hard or soft, may be used. For this reason, the fifth layer L5 is also named the "identify layer".

Alternatively, at the associating step S20, at least one geographical parameter is associated with each layer L1, L2, L3, L4 and L5.

As an example, a parameter is the distance range delimiting a layer L1, L2, L3, L4 and L5, said distance range being associated with a begin range and an end range.

According to an embodiment, the distance range associated with each layer L1, L2, L3, L4 and L5 is predefined and static.

According to another embodiment, the distance range associated with each layer L1, L2, L3, L4 and L5 is dynamically defined depending on predefined criteria. For instance, the distance range can dynamically vary over time, depending on at least one criterion chosen among the following list: tactical scenarios, threat levels, risk mitigation levels, enemy entities capabilities, offensive means of the reference entity RE and defensive means of the reference entity RE.

At the obtaining step S30, data representative of a position of said suspicious entity SE with respect to the layers L1, L2, L3, L4 and L5 of the battlefield environment are obtained.

According to the illustrated method for evaluating, data representative of the trajectory history information for said entity over the different layers L1, L2, L3, L4 and L5 are also obtained at the obtaining step S30.

According to the illustrated method for evaluating, at the obtaining step S30, data representative of the speed of said suspicious entity SE, the heading angle of said suspicious entity SE and the closest point of approach of said suspicious entity SE with relation to the reference entity RE are also obtained.

The direction of the suspicious entity SE is a projection of its heading angle with respect to the reference entity RE. To express this direction, the bearing to the suspicious entity RE and the heading of the suspicious entity SE are used.

The bearing to the suspicious entity SE is given by a sensor. It is the angle at which the suspicious entity SE is considering the heading reference entity RE as pointing to 0 degree.

The closest point of approach is notably expressed in terms of distance. Such distance is labeled closest point of approach distance $d_{CPA}$.

The closest point of approach distance $d_{CPA}$ uses the current speeds and positions of the suspicious entity SE and of the reference entities RE. Each value is obtained by using a sensor.

A common formula to calculate the closest point of approach distance $d_{CPA}$ is to calculate first the closest point of approach time and then to derive a distance.

The closest point of approach time is the time at which two boats will be at the closest point.

The distance between two points identified by their latitude and longitude can be obtained by using the Haversine or Vincenty's formulae.

The Haversine formula is an equation important in navigation, giving great-circle distances between two points on a sphere from their longitudes and latitudes. It is a special case of a more general formula in spherical trigonometry, the law of haversines, relating the sides and angles of spherical triangles.

Preferably, the distance between two points identified by their latitude and longitude can be obtained by using the Vincenty's formulae.

Vincenty's formulae are two related iterative methods used in geodesy to calculate the distance between two points on the surface of a spheroid, developed by Thaddeus Vincenty (1975). These formulae are based on the assumption that the figure of the Earth is an oblate spheroid, and hence are more accurate than methods such as great-circle distance which assume a spherical Earth. The first (direct) method computes the location of a point which is a given distance and azimuth (direction) from another point. The second (inverse) method computes the geographical distance and azimuth between two given points. Both methods have been widely used in geodesy because they are accurate to within 0.5 mm (0.020") on the Earth ellipsoid.

According to the illustrated method for evaluating, at the obtaining step S30, data related to a change in the layer L1, L2, L3, L4 and L5 to which the suspicious entity SE belongs is obtained.

According to the illustrated method for evaluating, at the obtaining step S30, data representative of the dangerousness of said suspicious entity SE are also obtained.

The dangerousness helps to quantify the worst impact the suspicious entity SE can have on the reference entity RE, based on the effectors on board of the suspicious entity SE. Data representative of the dangerousness can be directly a scale measuring the intensity of damages, or more indirectly the type of effector (gun, bomb or rocket). The type of effector can be entered manually by an operator or provided by the system using sensor information. By default, some pre-defined effectors can be assigned to categories of boats.

According to the illustrated method for evaluating, at the obtaining step S30, data representative of the identity of the suspicious entity SE are also obtained.

For example, the identity of the suspicious entity SE is entered manually by an operator, notably by using the keyboard 22.

Data representative of the identity can be constructed automatically from pre-defined rules. For instance, a suspicious entity SE that is considered as "neutral" and enters the engage layer (second layer L2) can be automatically considered as "hostile".

According to the illustrated method for evaluating, at the obtaining step S30, data representative of the urgency of the potential threat represented by the suspicious entity SE are also obtained.

By definition, the urgency takes into account the time at which the suspicious entity SE can engage the reference entity RE and the time until which the reference entity RE can engage the suspicious entity SE.

According to the illustrated method for evaluating, at the obtaining step S30, data representative of the group impact of the plurality of entities on the suspicious entity SE are also obtained.

Data representative of the group impact is provided manually by an operator which identifies groups of entities that realize a coordinated action. It can also be provided by the system using sensor information to correlate the behavior of two or more suspicious entities SE and allocate them a group identifier.

At the determining step S40, the level of threat of the suspicious entity SE using the obtained data is determined.

At the determining step S40, the obtained data are aggregated using possibly two decision models. The first one is a Choquet integral and the second one is the Generalized Additive Independence (GAI) model.

Choquet integral is a subadditive or superadditive integral created by the French mathematician Gustave Choquet in 1953. It was initially used in statistical mechanics and potential theory, but found its way into decision theory in the 1980s, where it is used as a way of measuring the expected utility of an uncertain event. It is applied specifically to membership functions and capacities. In imprecise probability theory, the Choquet integral is also used to calculate the lower expectation induced by a 2-monotone lower probability, or the upper expectation induced by a 2-alternating upper probability. The Choquet integral has been applied to multi-criteria decision analysis in the 1990s. Its main asset in this context is its ability to represent complex decision strategies such as veto criteria, favor criteria, synergies among criteria and redundancy among criteria to cite a few.

The Generalized Additive Independence (GAI) model has been introduced by Peter C. Fishburn in 1967 as a generalization of additive utility in multi-attribute utility theory. It did not receive much attention at that time. Its importance arises from the Artificial Intelligence community with the work of F. Bacchus and A. Grove in 1995. Since the 2000s, this model is recognized as a relevant model for representing preferences in a compact way (not storing the utility for potential alternative) while being able to represent any kind of interaction among the attributes.

In addition or alternatively, at the determining step S40, the obtained data are aggregated using either a Choquet integral, a GAI model, or a combination of both.

Preferably, the GAI model is used to obtain an ordering (according to the threat level) between the obtained data relatively to some point of view, for instance the kinematics criteria. Then, the Choquet integral is used to aggregate the output of the GAI model with other obtained data, representing other points of view.

Figure 4:
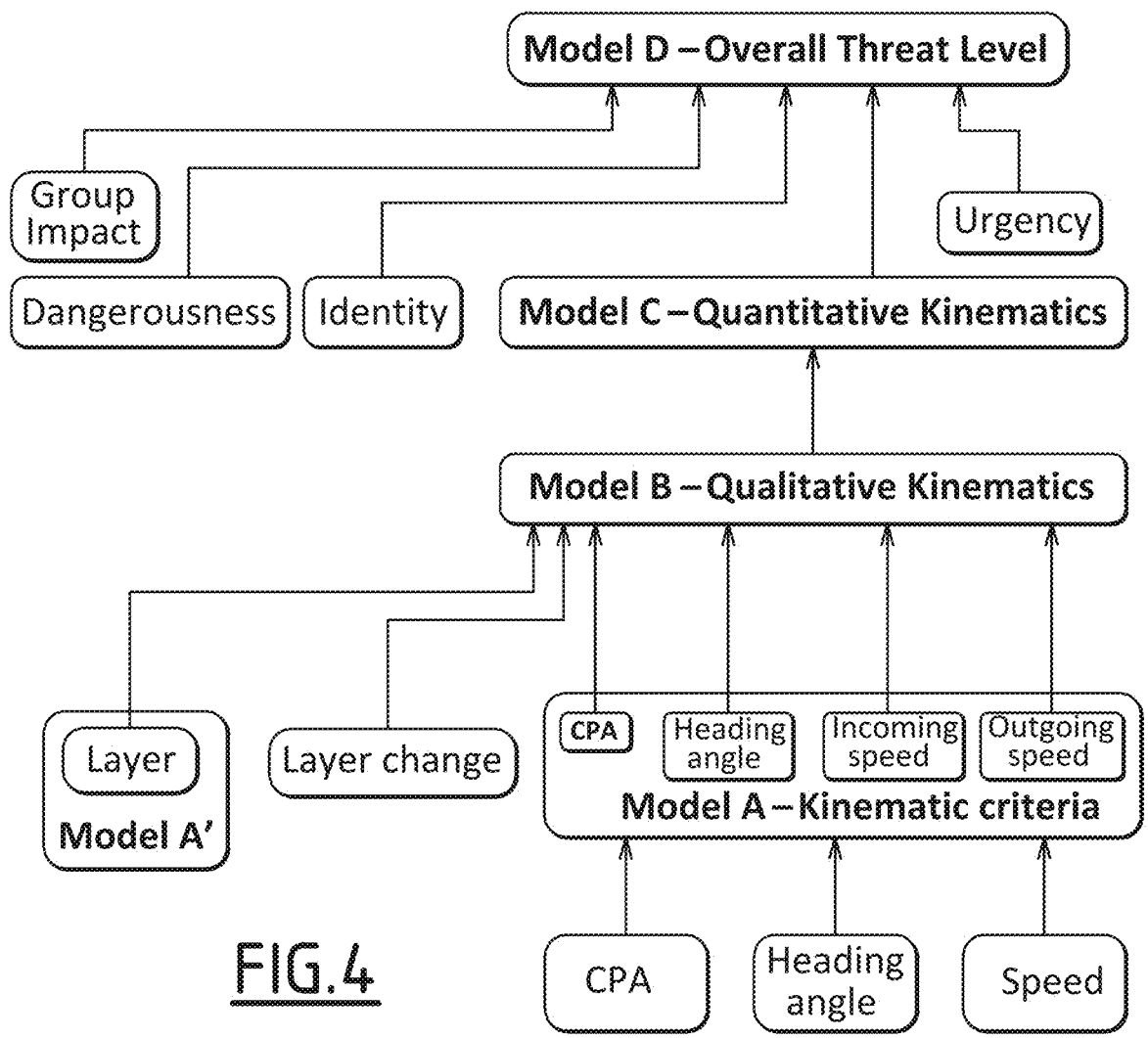
FIG. 4 is a flowchart of an example of carrying out the step of determining the level of threat of the method for evaluating the level of threat illustrated by FIG. 2.

As a specific example, at the determining step, several models are used simultaneously as schematically illustrated by the flowchart of FIG. 4.

According to the example of FIG. 4, fifth models are used: a first model A, a second model A', a third model B, a fourth model C and a fifth model D.

The first model A takes into account kinematic criteria.

According to the example of FIG. 4, the first model A takes into account the speed of said suspicious entity SE, the heading angle of said suspicious entity SE and the closest point of approach of said suspicious entity SE.

The use of the first model A is to introduce new kinematic parameters from the three parameters just previously mentioned, in order to integrate expertise on monotonicity relation between the input parameters and the evolution of the threat level.

The "CPA" parameter that is an output of model A basically indicates that the smaller the closest point of approach distance, the higher the threat level. The "Heading angle" parameter that is an output of model A is $1+\cos(\theta)/2$, where $\theta$ is the heading angle. It indicates that the threat level is larger if the suspicious entity SE is pointing towards the reference entity RE.

The monotonicity regarding the mean speed parameter is a little bit more complicated and can be decomposed into two separate criteria: the "Incoming speed" parameter and the "outgoing speed" parameter.

The "Incoming speed" parameter is an output of model A expressing the fact that the higher the speed, the larger the threat level, when the said suspicious entity SE is pointing towards the reference entity RE.

The "outgoing speed" parameter is an output of model A expressing the fact that the larger the speed, the smaller the threat level, when the said suspicious entity SE is pointing in the opposite direction to the reference entity RE.

In other words, in general terms, model A transforms the basic kinematic parameters in order to ease their aggregation in model B.

The second model A' also takes into account position criteria.

According to the example of FIG. 4, the second model A' takes into account the distance of said suspicious entity SE.

The use of the second model A' enables to obtain additional kinematic data relative to the layer L1, L2, L3, L4 and L5 to which the suspicious entity SE belongs and/or will belong, and also the distance of the said suspicious entity SE to the boundaries of the considered layer.

The third model B carries out qualitative kinematics treatment based on the data calculated by the first model A and by the second model A', on data relative to the layer, the change of layer, the CPA distance, the incoming and outgoing speed and the heading angle of said suspicious entity SE.

The threat level function is calibrated from training instances (examples of suspicious entities for which we only know the values of the representative data) that are rated by experts (in terms of their threat level).

Model B only aims at representing the qualitative part of the training instances, that is model B is learnt only to rank order the training instances in the correct way. A GAI model is used in this layer.

The fourth model C carries out quantitative kinematics treatment based on the output data of model B.

Model B does not return the correct threat level. Model B rather returns a threat level that enables ranking the suspicious entities SE in the correct way.

Model C is then used to modify the qualitative score on model B in order to represent not only the correct orderings but also the correct rates of the training instances. Model C is just a simple function taking as argument the output of model B.

Models A, B and C focus only on the kinematics part of the parameters. The output of model C is a threat level that takes into account all parameters related to the kinematics of the suspicious entity SE.

The fifth model D determines the overall threat level based on the output data of model C, the dangerousness of said suspicious entity SE, the identity of the suspicious entity SE, the urgency of the potential threat represented by the suspicious entity SE and the group impact of the plurality of entities on the suspicious entity SE.

Model D returns a threat level that integrates all aspects of the threat. It is thus the overall threat level of the said suspicious entity SE that is presented to the operator. A Choquet integral is used in the aggregation function of model D.

As explained in accordance with the flowchart of FIG. 2, the method for evaluating takes into account multiple relevant criteria. More precisely, in the described context, the threat assessment relies on a risk analysis using the criteria for each weapon a track has on board. For instance, the following criteria are used:

group impact: this criterion evaluates the impact of a group according to the group size of the plurality of entities and the layer position of the track. A suspicious entity SE is more threatening if it belongs to a group, all other parameters being equal.

Dangerousness: this criterion evaluates the worst impact the suspicious entity SE can produce on the reference entity RE. It depends on the effectors on board of the suspicious entity SE.

Urgency: urgency aggregates two complementary criteria: target effector ranges and the effector range of the reference entity RE. Target effector range expresses the time (in seconds) before the suspicious entity SE can engage the reference entity RE. It is computed using the target weapon range; the lower this time is the higher the threat is. The weight is higher to give the priority to the survivability of the navy ship. The effector range of the reference entity RE expresses the time (in seconds) before the reference entity can engage the suspicious entity SE. It is computed using the current speed of the track and the distance to hard kill layer. The lower this time is, the higher the threat is (capturing the lack of margin to take a decision).

Identity: the identity of the track (friend, hostile . . . etc.), pending is considered as hostile. There is a veto on this criterion: if the track is a friend the global threat level is 0.

CPA distance: if the CPA distance is 0 then the threat is maximal, threat level varies according to the distance.

layer position: the threat level increases according to the layer (for instance, engage layer is associated to a utility of 1, etc.). It can be refined by using the distance between the suspicious entity SE and the reference entity RE. The smaller the distance, the higher the threat level.

change in layer position: if the layer number decreases, the target boat is coming closer to the reference entity RE, hence its threat level is maximal.

speed direction: this criterion capture the speed according to the heading angle If the suspicious entity SE is not heading to the reference entity RE the speed has a negative value otherwise it has a positive value.

heading angle: it indicates the direction of the speed vector of the suspicious entity SE with respect to the position of the reference entity RE.

Thus, reliable data relative to the level of threat of at least one entity among a plurality of entities in a battlefield environment can be obtained.

This enables to provide to an operator a reliable decision support tool since evaluating the threat is the first step towards deciding an engagement plan.

Figure 5:
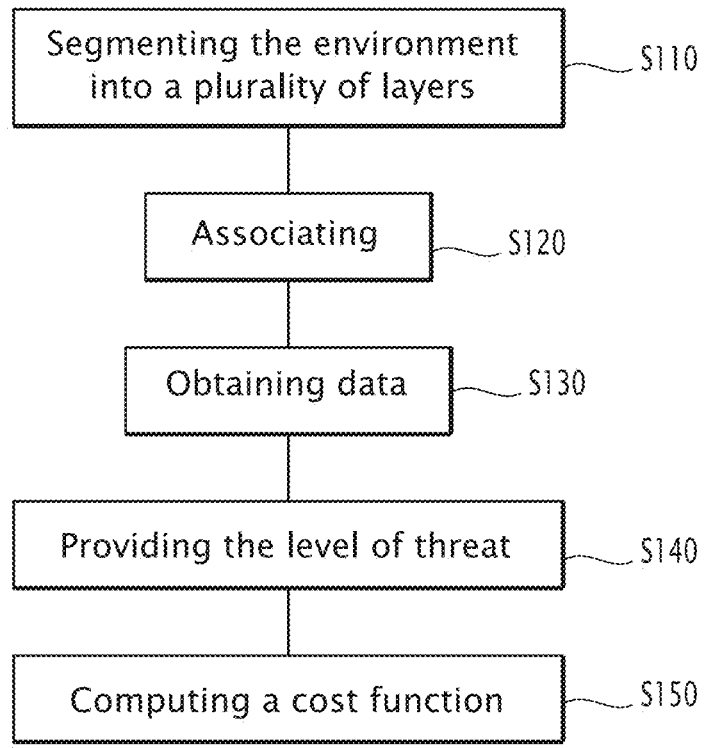
FIG. 5 is a flowchart of an example of carrying out of a method for determining tactical actions for protecting a reference entity.

Another operation of the system 10 is now described in reference to the flowchart of FIG. 5, which illustrates an example of carrying out a method for determining tactical actions for protecting the reference entity RE with respect to a plurality of entities in a battlefield environment.

The method for determining comprises four steps: a segmenting step S110, an associating step S120, an obtaining step S130, a providing step S140 and a computing step S140.

The same remarks made for the segmenting step S10 for the method for evaluating apply for the segmenting step S110 of the method for determining.

At the associating step S120, each layer L1, L2, L3, L4 and L5 is associated to actable deterrent systems. As previously explained, five layers are considered as an example, being understood that other number of layers may be considered.

For example, actable deterrent systems are a gun, a long range acoustic device (also known under the acronym LRAD), a radio, a laser adapted to emit intimidating spotlights and/or to dazzle a suspicious entity SE, a radio or a horn.

The same remarks made for the segmenting step S120 for the method for determining apply for the associating step S120 of the method for determining.

At the obtaining step S130, data representative of the probability, for each deterrent system, that the considered deterrent system deters a suspicious entity SE in the associated layer L1, L2, L3, L4 and L5 is obtained.

Such probabilities are named hit probabilities.

According to an embodiment, hit probabilities are expert defined functions which act as estimators of the probability for a given weapon or effector to actually hit its target and/or have the intended effect. As of now, it simply combines individual weapons' effectiveness diminishing with range (hit probabilities stricto sensu) together with maximum allowed firing angle to form "complete" hit probabilities. In other terms, if a track is situated outside the weapon's firing "cone", even within firing range, the "complete" hit probability will be 0. Otherwise, it will have a floating point probability, between 0 (low) and 1 (high) decreasing with range, eventually hitting 0 if the track's position exceeds the maximum firing range. In pragmatic terms, choosing an action with a high hit probability is good because there is a strong chance the corresponding weapon or effector will hit the targeted track hard, therefore decreasing the overall implicit threat level of the suspicious entity SE.

According to another embodiment, the hit probabilities also depend from the nature of the suspicious entity SE.

The nature is linked to the category to which the suspicious entity SE belongs. For instance, the category is a drone, a go-fast, a fast patrol boat or a jetski.

Applied to the hit probabilities, this notably means that the gun may have a higher hit probability on a small boat than on a high boat. In such context, the hit probability is should rather be construed as a probability of success than a pure hit probability. In this specification, the expression "hit probability" encompasses both meanings.

At the obtaining step S130, data representative of the nature of the suspicious entity SE are obtained.

Alternatively, at the obtaining step S130, data representative of the consumption of the considered deterrent system are obtained.

The same remarks made for the obtaining step S30 for the method for evaluating may also apply for the obtaining step S130 of the method for determining.

At the providing step S140, for each entity, the level of threat of said suspicious entity SE is provided.

Such providing step S140 may be carried out by carrying out the method for evaluating illustrated by the flowchart of FIG. 2.

At the computing step S150, a cost function C is computed for determining the deterrent systems to be engaged by the reference entity RE for rendering extremal the cost function C. By this sentence, it should be understood that there is a cost function C, that this cost function C is evaluated for several points of evaluation and that part of the computing step results in a navigation from one evaluation point to another evaluation point.

In addition, it is to be noted that the meaning of cost function C is construed in a broad manner. Generally a difference is made between a cost function and an objective function according to the objective, rendering maximal or minimal. In this invention, a cost function C is to be understood as meaning a cost function in a restricted manner or an objective function.

The cost function C is a function depending from the provided level of threat and the obtained data.

According to a specific embodiment, the cost function of an engagement plan at the computing step S150 is the sum over all suspicious entities SE of the product of the level of threat of the suspicious entity SE by the probability to hit that suspicious entity SE with the effector allocated to this suspicious entity SE in the engagement plan.

Computing the cost function C may results in rendering maximal profit, vehicle flows, coverage or impact.

Computing the cost function C may also results in rendering minimal costs, delays or fuel consumption.

For determining a maximum or a minimum for the cost function C, an exhaustive tree enumeration of each tactical action can be used.

Alternatively, greedy heuristics may be used to obtain rapidly an extremum for the cost function C.

According to a specific embodiment, at the computing step S150, the cost function C also depends from imposed engagement policies.

For instance, a gun can only be used in the second layer L2 whereas, in the third layer L3, the long range acoustic devices and the laser in a dazzling configuration should be used. In the fourth layer, it may be considered to use mild broadcasting sound-based effectors such as the horn emitting a strong deterring noise or the radio airing warning messages aimed at suspicious entities SE. These imposed engagement policies ensure a gradual response to the level of threat of a suspicious entity SE.

Thanks to the invention, reliable data to help building a good engagement plan can be obtained.

This enables to provide an operator with a reliable decision support tool.

Figure 6:
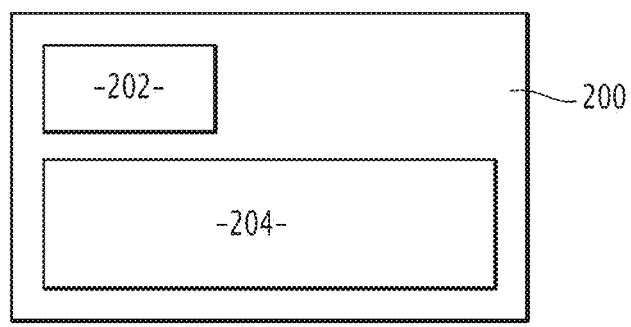
FIG. 6 is a schematic representation of a decision support system.

The method for evaluating and the method for determining may be carried out by a decision support system 200 as represented on FIG. 6.

The decision support system 200 comprises an obtaining unit 202 and a calculator 204.

The obtaining unit 202 is adapted to obtain data representative of a position of said entity SE with respect to the layers L1, L2, L3, L4 and L5 of the battlefield environment.

The obtaining unit 202 is a unit adapted to obtain data representative of the probability, for each deterrent system, that the considered deterrent system deters an suspicious entity SE in a layer L1, L2, L3, L4 and L5.

The calculator 204 is adapted to segment the battlefield environment into a plurality of layers L1, L2, L3, L4 and L5.

The calculator 204 is further adapted to determine the level of threat of said suspicious entity SE using the obtained data.

The calculator 204 is also adapted to associate actable deterrent systems with each layer L1, L2, L3, L4 and L5, to provide, for each suspicious entity SE, the level of threat of said suspicious entity SE and to compute the cost function C for determining the deterrent systems to be engaged by the reference entity RE for rendering extremal the cost function C, the cost function C being a function depending from the provided level of threat and the obtained data.

In such embodiment, the combination of the obtaining unit 202 and the calculator 204 is a system for determining tactical actions for protecting the reference entity RE with respect to a plurality of entities in a battlefield environment and a system for evaluating the level of threat of at least one suspicious entity SE among a plurality of entities in a battlefield environment.

Furthermore, the decision support system 200 is adapted to carry out a decision support method comprising the steps of carrying out the method for evaluating and generating tactical recommendations in association with said suspicious entity SE depending on the determined level of threat.

In addition, such decision support system 200 is adapted to carry out a decision support method, the decision support method comprising the steps of carrying out the method for determining and of generating tactical recommendations in association with the determined deterrent systems to be engaged.

In each embodiment, it appears that the invention targets the protection of navy vessels in piracy zones. In such zones, pirates or enemy ships sometimes launch swarm attacks on allied vessels. Allied military vessels have the mission to protect civil ships, in particular commercial ones. To this end, defense layers are defined prior to the mission on the basis of the worst case enemy weapon range and associated rules of engagement are defined to state what weapons or effectors may be used against what particular enemy track. The invention described in the present patent application aims at solving two computational problems in this context: perform a multi-criteria assessment of the situation's threat level and procure an optimized engagement plan accordingly.

The provided solution may apply in other context, for instance for the defense of a site where physical layers can also be defined According to a specific embodiment, several threats t1, t2, . . . , tk, . . . (k being an integer) are provided. The initial threat level for threat tk is u(tk). The initial threat level for threat tk measures the consequence of the realization of the effect of tk on the reference ship RE, combined with the probability that such threat tk realizes this effect.

Each action corresponds to a counter-measure. We are interested in the effect of the action (the counter-measure). The probability that threat tk "reacts positively" to the counter-measure if this action is produced on tk is denoted P(+cm; tk). The meaning of the expression "react positively" depends on the nature of the action. As an illustration, it is meant that the threat is destroyed or neutralized if the action is a hard action, that the threat is stopped if the action is a dissuasion action, and that the threat leaves if the action is a soft action (horn for instance).

Then the "threat level after the engagement plan" for threat tk is, when an action is performed on the threat:

$$U(t\_k|+cm) \times P(+cm; t_{13}\_k) + U(t\_k|-cm) \times P(-cm; t\_k)$$

Where:
U(t_k|+cm) is the utility of the threat tk if the threat tk reacts positively to action cm (by definition, 0≤U(t_k|+cm)<U(t_k)),
U(t_k|-cm) is the utility of the threat tk if the threat reacts negatively to action cm (we have U(t_k|-cm)U(t_k)), and
P(+cm; t_k)+P(-cm; t_k)=1.

If no action is performed in the threat, its "threat level after the engagement plan" is equal to U(t_k).

In an embodiment, the threat level is updated after the optimal engagement planning is computed. In such embodiment, the decision support method is carried out iteratively. This means that the capacity to engage is used in the step of determining the threat as described in the following paragraph.

For a suspicious entity SE on which an action is produced, the threat level is obtained as the addition of the utility of said suspicious entity SE if said suspicious entity SE reacts positively to the action multiplied by the probability that said suspicious entity SE reacts positively, with the utility of the said suspicious entity SE if said suspicious entity SE reacts negatively to the action multiplied by the probability that the suspicious entity SE reacts negatively. If the engagement plan does not produce any action to a suspicious entity SE, the threat level is not updated.

The embodiments and alternative embodiments considered here-above can be combined to generate further embodiments of the invention.

The invention claimed is:

1. A method for determining tactical actions for protecting a reference entity with respect to a plurality of entities in a battlefield environment, the method comprising:
segmenting the battlefield environment into a plurality of layers around the reference entity,
associating actable deterrent systems with each layer,
obtaining data representative of the probability, for each deterrent system, that a considered deterrent system deters an entity in an associated layer, wherein said obtaining comprises obtaining first kinematic parameters relative to each of said plurality of entities,
providing, for each entity, a level of threat of said entity, wherein said providing comprises
computing second kinematic parameters from said first kinematic parameters, for each of said plurality of entities, said second kinematic parameters presenting a monotonic relationship with regards to the level of threat,
aggregating the second kinematic parameters to obtain a threat level function giving a first level of threat,
calibrating the threat level function with a plurality of training instances to obtain a plurality of calibrated threat levels, and
computing a second threat level using the first threat level and the calibrated threat levels, and
computing a cost function for determining the deterrent systems to be engaged by the reference entity for rendering extremal the cost function, the cost function being a function depending from the level of threat and the obtained data.

2. The method for determining according to claim 1, wherein, at the obtaining step, data representative of a nature of the entity are obtained.

3. The method for determining according to claim 1, wherein, at the computing step, the cost function depends at least from the product of the provided level of threat and the obtained data.

4. The method for determining according to claim 1, wherein at the obtaining step, data representative of the consumption of the considered deterrent system are obtained.

5. The method for determining according to claim 1, wherein at the computing step, imposed engagement policies are taken into account.

6. The method for determining according to claim 1, wherein the method further comprises a step of associating with each layer a category of tactical actions that may be engaged by the reference entity.

7. The method for determining according to claim 1, wherein the method further comprises a step of associating at least one geographical parameter with each layer, said parameters comprising the distance range delimiting the layer, said distance range being associated with a begin range and an end range.

8. The method for determining according to claim 1, wherein the distance range associated with each layer is predefined and static.

9. The method for determining according to claim 1, wherein the distance range associated with each layer is dynamically defined depending on predefined criteria.

10. The method for determining according to claim 1, wherein the entities and the reference entity are ships.

11. A decision support method comprising the steps of:
carrying out a method for determining tactical actions for protecting a reference entity with respect to a plurality of entities in a battlefield environment according to claim 1,
generating tactical recommendations in association with the determined deterrent systems to be engaged.

12. A computer program comprising instructions for carrying out the steps of a method according to claim 1 when said computer program is executed on a suitable computer device.

13. A computer readable medium having encoded thereon a computer program according to claim 12.

14. The method for determining according to claim 1, wherein, calibrating the threat level comprises a qualitative expert rating of the calibrated threat levels.

15. A system for determining tactical actions for protecting a reference entity with respect to a plurality of entities in a battlefield environment, the system comprising:
 a calculator that segments the battlefield environment into a plurality of layers around the reference entity, and
 an obtaining unit adapted to obtain data representative of a probability, for each deterrent system, that the considered deterrent system deters an entity in the associated layer, wherein said obtaining unit obtains first kinematic parameters relative to each of said plurality of entities,
 the calculator being further adapted to associate actable deterrent systems with each layer, to provide, for each entity, a level of threat of said entity and to compute a cost function for determining the deterrent systems to be engaged by the reference entity for rendering extremal the cost function, the cost function being a function depending from the level of threat and the obtained data,
 wherein the calculator further computes second kinematic parameters from said first kinematic parameters, for each of said plurality of entities, said second kinematic parameters presenting a monotonic relationship with regards to the level of threat, the calculator further aggregating the second kinematic parameters to obtain a threat level function giving a first level of threat, calibrating the threat level function with a plurality of training instances to obtain a plurality of calibrated threat levels, and computing a second threat level using the first threat level and the calibrated threat levels.

16. A decision support system comprising a system for evaluating according to claim 15, the calculator being further adapted to generate tactical recommendations in association with the determined deterrent systems to be engaged.

* * * * *